May 19, 1925.
L. G. BERGQUIST
1,537,981
IMPLEMENT WHEEL SCRAPER
Filed Aug. 27, 1924
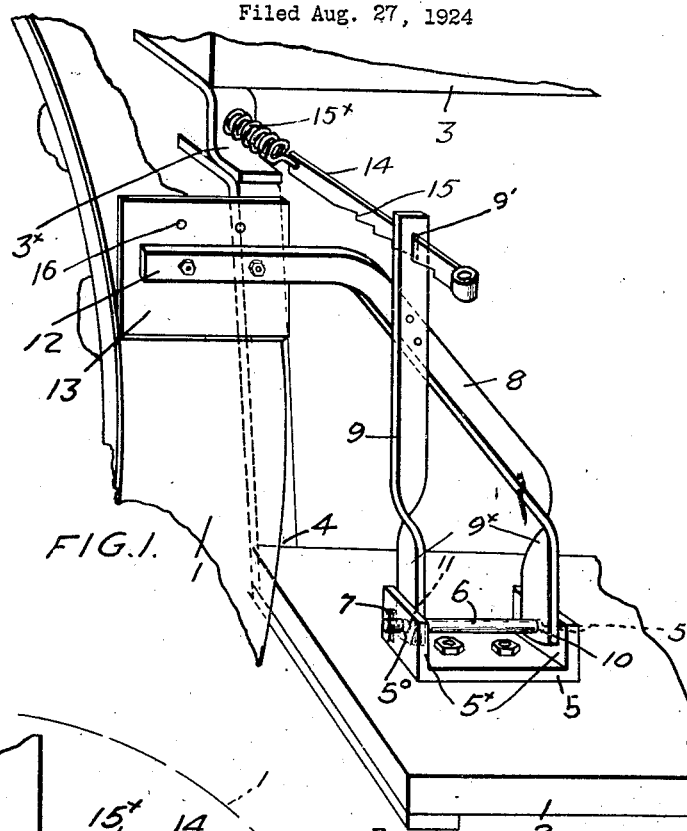
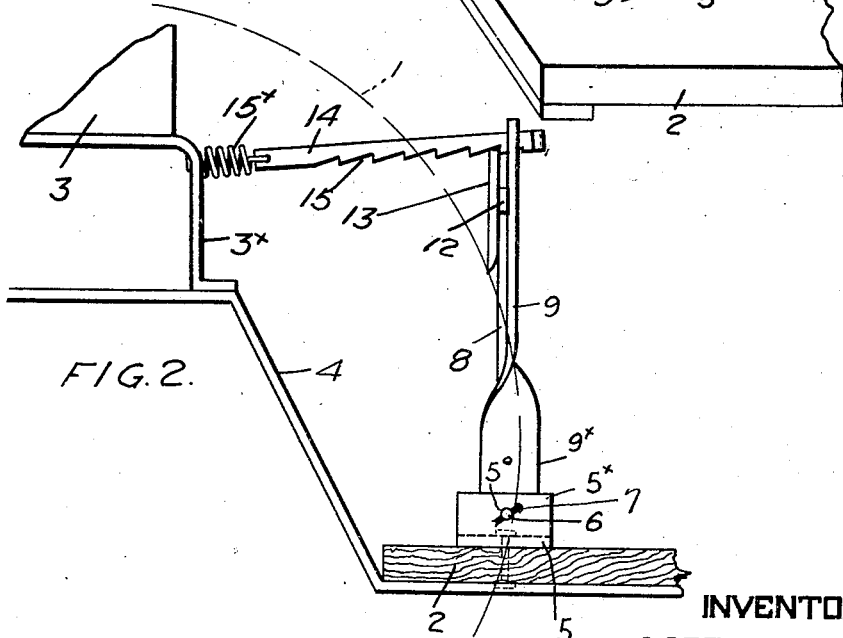
INVENTOR
LARS G. BERGQUIST
By Fetherstonhaugh&Co
ATTYS.

Patented May 19, 1925.

1,537,981

UNITED STATES PATENT OFFICE.

LARS GUSTAF BERGQUIST, OF SHAUNAVON, SASKATCHEWAN, CANADA.

IMPLEMENT-WHEEL SCRAPER.

Application filed August 27, 1924. Serial No. 734,550.

*To all whom it may concern:*

Be it known that I, LARS GUSTAF BERGQUIST, a subject of His Majesty King George V of Great Britain, and a resident of the town of Shaunavon, in the Province of Saskatchewan, Canada, have invented certain new and useful Improvements in Implement-Wheel Scrapers, of which the following is the specification.

My invention relates to improvements in scrapers, particularly adapted to agricultural implement wheels, and the object of the invention is to devise a scraper which will cut clean by following any unevenness in the wheel periphery and thereby leaving the wheel free from dirt, and which in dry weather can be folded back out of contact with the wheel so as to prevent the scraping edge wearing away unnecessarily, and it consists essentially of the arrangement and construction of parts as hereinafter more particularly explained.

Fig. 1 is a perspective view of a fragmentary portion of an agricultural implement wheel and an adjacent portion of a running board and seed box and my device applied thereto.

Fig. 2 is cross sectional view of the parts shown in Fig. 1, the position of the implement wheel being indicated by dotted lines.

In the drawings like characters of reference indicate corresponding parts in each figure.

1 indicates a portion of an agricultural implement wheel, 2 the running board, 3 the seed box and 4 the bracket support by which the running board is supported, 5 is a bracket having upturned ends $5^x$ having aligned orifices $5^o$. 6 is a bolt extending through the orifices $5^o$ and secured therein by a split pin 7. 8 and 9 are bar members forming a forked bracket $9^x$, the members of which are provided at their lower ends with orifices 10 and 11 through which the bolt 6 extends.

The upper portion of the bar member 8 is formed into a horizontally outwardly extending arm 12 to which is secured the scraper plate 13. 14 is a bar provided at its lower edge with a ratchet rack 15 adapted to engage the lower end of the slot 9'. $15^x$ is a tension spring by which the inner end of the bar 14 is secured to the supporting brackets $3^x$ of the seed box 3 or to any other suitable supporting member.

It will thus be seen that when the plate is swung into contact with the wheel periphery of the implement that the bar 14 engaging the upper tower of the slot 9' with the spring $15^x$ in tension will resiliently hold the cutting or lower edge of the scraper plate 13 against the surface of the wheel and therefore insure that it will follow all the unevennesses thereof so as to cut all the dirt clinging thereto cleanly so as to leave the wheel periphery entirely free from dirt.

At the same time when it is desired in dry weather the bar 14 may be disengaged from the bar 9 and the scraper swung back out of engagement with the wheel periphery, the bracket formed by the bars 8 and 9 resting upon the upper face of the running board.

By this means it will be seen that the wearing away of the cutting edge of the scraper plate will be greatly reduced, it being only necessary to use the same in wet weather when the ground is moist. The plate 15 may also be provided with two series of orifices 16 so that the plate 13 may be adjustably secured to the arm 12. By this means when the cutting edge of the scraper plate wears away the plate may be adjusted down to contact with the wheel periphery.

By this disclosure it will be seen that I have devised a very simple form of scraper which will always follow any unevenness which may occur in the surface of the wheel periphery and yet which may at the same time be easily and entirely removed from the wheel in dry weather or at any other time when it is unnecessary to use the same.

What I claim as my invention is:

1. In a scraper for agricultural implements, the combination with the running board and a wheel of the implement, of a bracket pivotally mounted upon the running board and having a laterally extending arm, a plate secured to the arm and adapted to contact at its lower edge with the periphery of the implement wheel, a bar provided with a toothed edge adapted to engage the swinging bracket and a tension spring connected to the inner end of the bar at one end and to the stationary portion of the implement at the opposite end.

2. In a scraper for agricultural implements, the combination with the running board and a wheel of the implement, of a bracket pivotally mounted upon the running board and having a lateral extending arm and a member provided with a horizontal engaging edge, a plate secured to the arm and adapted to contact at its lower edge with the periphery of the implement wheel, a horizontal bar member extending at right angles to the aforesaid horizontal engaging edge with which it is adapted to engage in a plurality of spaced apart points arranged longitudinally of the bar, and means connecting the inner end of the bar to a suitable support to permit its swinging in a vertical plane in and out of engagement with the aforesaid engaging edge.

LARS GUSTAF BERGQUIST.